United States Patent [19]

Toyoda

[11] 3,765,999
[45] Oct. 16, 1973

[54] SYNTHETIC PAPER
[75] Inventor: Tokashi Toyoda, Yokkaichi, Japan
[73] Assignee: Kabushiki Kaisha Oji Yuka Goseishi Kenkyujo, Tokyo-To, Japan
[22] Filed: Dec. 28, 1970
[21] Appl. No.: 101,574

[30] Foreign Application Priority Data
Dec. 28, 1969 Japan............... 44/105111

[52] U.S. Cl.............. 161/170, 156/77, 156/229, 161/159, 161/162, 161/402, 264/210, 264/291
[51] Int. Cl............................................. B32b 5/16
[58] Field of Search............ 161/159, 162, 168–170, 161/402; 260/2.5; 264/288, 289, 291, 292, 45, 210; 156/77–79, 229

[56] References Cited
UNITED STATES PATENTS
3,097,991  7/1963  Miller et al................. 161/169 X
3,227,664  1/1966  Blades et al................. 260/2.5
3,290,207  12/1966  Magat et al................. 161/178

Primary Examiner—William A. Powell
Attorney—Robert E. Burns and Emmanuel J. Lobato

[57] ABSTRACT

A synthetic paper comprising a paper-like layer, which layer comprises a film-like matrix of a first resin and a reticulated structure consisting of fibrillated fibers made of a second resin dispersed in the matrix, and which layer contains a fine inorganic filler and voids therein. This paper is produced by drawing or stretching a drawable or stretchable sheet of a mixture of at least two resins and a fine inorganic filler at a temperature which is suitable for a first resin of the resin mixture and is less or not suitable for a second resin in the resin mixture thereby to produce a paper-like film comprising the matrix of the first resin and the reticulated structure of the second resin.

9 Claims, 5 Drawing Figures

SYNTHETIC PAPER

BACKGROUND OF THE INVENTION

This invention relates to synthetic papers consisting of a paper-like film or films and also to a process for producing such papers.

Recently, so-called synthetic papers consisting of paper-like films made of synthetic resin have been proposed as substitutes for conventional papers made of cellulose fibers entangled together. In many cases, the paper-like film is made of a synthetic resin treated to acquire papery characteristics. The synthetic papers may be made into a single layer structure or laminated structure of paper-like layers each consisting of a synthetic resin film treated to acquire the papery characteristics.

Although the paper-like layer can be obtained from a synthetic resin film treated to obtain the papery characteristics, the technique heretofore employed for acquiring these papery characteristics in the film has comprised dispersing a material opaque to light rays in the synthetic resin film, and, as the material opaque to light rays, minute bodies of organic or inorganic substance (as an example of the former material, a rubber-like polymer in granular form dispersed in a polystyrene matrix may be employed, and as an example of the latter material, any suitable inorganic powder material is employed) and minute voids or the like have been employed (it being considered that minute voids created by drawing the sheet containing the minute bodies can contribute much to the abovementioned opaque nature). Of course, the minute voids may also be created by employing a foaming agent admixed in the sheet. In all cases, however the minute bodies or voids are of substantially granular configuration, and these have served little for improving the mechanical properties of the synthetic paper thus obtained.

SUMMARY OF THE INVENTION

It is an object of the present invention to provide a novel synthetic paper which has a reduced specific gravity, much improved whiteness, balanced tensile strengths in the longitudinal and traversing directions, better printability, and a better tactile feel of the surfaces.

Another object of the present invention is to provide a novel process for producing a synthetic paper including at least a paper-like layer, wherein a reticulated structure consisting of fibrillated synthetic resin fibers is employed in at least one part of the material opaque to light rays.

These and other objects of the invention are achieved by a novel synthetic paper comprising at least one paper-like layer which is made of a film-like matrix of a synthetic resin containing another type of synthetic resin and drawn or stretched in at least one direction so that a reticulated structure of fibrous shape is created in the other type of synthetic resin, and, furthermore, an inorganic fine filler of a quantity less than 60 percent by weight of the resin contents is added to the matrix of the synthetic resin, whereby a void percentage of more than 10 percent is thereby obtained, rendering the paper-like layer substantially opaque to light rays.

The term "voids" or "void percentage" is herein defined as $$\frac{(\text{true specific gravity}) - (\text{apparent specific gravity})}{(\text{true specific gravity})} \times 100,$$

wherein the true specific gravity is the specific gravity of the material mixed with the inorganic filler but not yet stretched to create voids.

According to the present invention in another aspect thereof, there is provided a novel process for producing the novel synthetic paper, in which process, a mixture containing at least two extrudable or drawable synthetic resins, the melting points or glass-transition temperatures of which are different by at least 15°C, and fine inorganic powder of a quantity less than 60 percent by weight of these synthetic resins is formed into a sheet-like configulation of drawable or stretchable nature, and this sheet-like substance is thereafter drawn or stretched along at least one direction thereof at a temperature which is suitable for drawing or stretching the synthetic resin component having a lower melting point or glass transition point but is lower than the optimum drawing temperature of the other synthetic resin having a higher melting point or glass transition point.

The terms "melting point" and "glass-transition temperature" are herein applied respectively to crystalline and non-crystalline resins of the drawable or stretchable synthetic resins.

According to the present invention in still another aspect thereof, there is provided another mode of producing synthetic papers, wherein a mixture comprising essentially at least two drawable synthetic resins of melting points or glass transition temperatures which differ by at least 15°C and fine inorganic powder of a quantity less than 60 percent by weight of these synthetic resins is formed into a laminated structure stretchable or drawable sheet of the mixtures of the resins, and this laminated sheet is thereafter drawn or stretched in at least one direction at a temperature which is suitable for drawing or stretching the synthetic resin having a lower melting point or glass transition temperature but is lower than the optimum drawing temperature of the other synthetic resin having a higher melting point or glass transition temperature.

The nature, principle, and utility of the present invention will be more clearly understood from the following detailed description of the invention when read in conjunction with the accompanying photographs and drawing.

BRIEF DESCRIPTION OF THE ILLUSTRATIONS

In the illustrations:

DETAILED DESCRIPTION OF THE INVENTION

Figure 1:
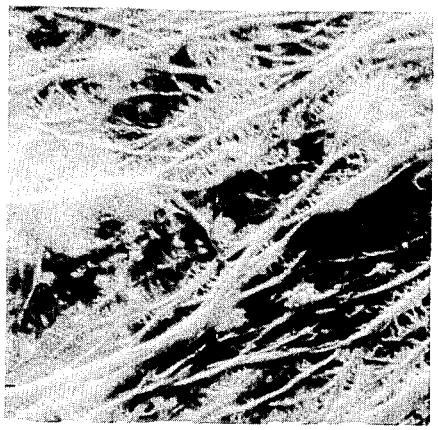
FIGS. 1 and 3 are microscopic photographs of surfaces of paper-like films which constitute preferred embodiments of the present invention.

The principal feature of the present invention is that the difference in the behaviors of two or more synthetic resins due to the difference in optimum drawing temperatures thereof is advantageously utilized. More specifically, when a mixture of these synthetic resins in a state of a non-oriented sheet is drawn or stretched at a certain temperature, the first synthetic resin whose optimum drawing or stretching temperature corresponds to this drawing temperature is drawn continuously into a drawn film, whereas the second synthetic resin having an optimum drawing temperature higher than the abovementioned temperature is fibrillated by the shearing force or tensile force caused at the time of drawing or stretching because of the coexistence of the easily drawable first synthetic resin, and, furthermore, the resulting fibrillated fibers are reticulated and dispersed into the drawn film of the first synthetic resin.

Generally speaking, the drawing temperature utilized in this production process according to the present invention is of a value suitable for drawing the first synthetic resin but is lower than the optimum drawing or stretching temperature of the second synthetic resin. Although a temperature suitable for drawing the first synthetic resin is related to the lower limit of the temperature range employable in the drawing process according to the invention, the temperature suitable for drawing, the first synthetic resin is of a value nearly equal to or a little higher than the optimum drawing temperature of the first synthetic resin (if the drawing temperature is too high, the drawn film will melt and break (reference: Example 5 set forth hereinafter)), there being an allowable range of the optimum drawing temperature. Accordingly, the lower limit of this allowable temperature range defines the lower limit of the drawing temperature employed in the process of this invention.

On the other hand, the upper limit of the drawing temperature used in this invention coincides with the optimum drawing temperature of the second resin. Since the second synthetic resin having a higher melting point is drawn under a restrained condition, the second synthetic resin is reticulated. For this reason, the drawing temperature employed in the invention cannot be a temperature higher than a temperature at which the second synthetic resin is easily elongated, in other words, the optimum drawing temperature, whereby the upper limit of the optimum drawing temperature range for the second synthetic resin defines the upper limit of the drawing temperature range employed in this invention.

Since the synthetic paper consisting of one or more paper-like layers is caused to be a reticulated structure comprising one drawn film-like mateix (preferably in two directions) of a synthetic resin and fibrillated fibers (having a diameter of from 0.5 to 10 microns) of a second synthetic resin dispersed in the first synthetic resin, the synthetic paper according to the present invention is quite different in its structure from the conventional synthetic paper which has been produced by bonding fibrillated fibers together in a form similar to unwoven cloth. The above described matrix of the paper-like layer according to the present invention is not necessarily of a solid structure, and, preferably, the matrix contains minute voids therein. The voids are created by drawing the film containing minute inorganic powder as described hereinafter, and the reticulated structure dispersed in the matrix in itself also contains extremely minute voids.

As a result, the synthetic paper according to the present invention, in a preferred form thereof, is provided with the following characteristic features.

1. A lower specific gravity

The synthetic paper has a lower specific gravity than that obtained merely by stretching a film containing inorganic minute powder. The reason for this is believed to be in the existence of minute voids contained in the reticulated structure included in the resin matrix.

2. Improved whiteness and opacity

This is believed to be caused also by the minute voids existing in the reticulated structure.

3. Balanced longitudinal and lateral strengths.

4. Smoother and more lustrous surface of the synthetic paper.

5. Excellent printability of the paper.

6. Excellent strength and opacity even when made thinner.

7. Excellent workability for producing secondary products.

A typical synthetic paper having the above described features can be obtained by initially admixing two kinds of synthetic resins, the melting points or glass transition temperatures thereof (hereinafter called simply the melting points) being different from each other by more than 15°C, adding thereto an inorganic powder so that a non-oriented sheet (in broader sense, this is defined as drawable sheet) is thereby formed, and drawing or stretching the sheet in two different directions or axes in the plane of the sheet.

More specifically, the two kinds of synthetic resins to be mixed into the above described non-oriented sheet should have melting points, in the above stated sense, differing from each other by more than 15°C. (If the difference of the melting points is less than 15°C, no fibrillation will be caused). The upper limit of the difference of the melting points is held to about 100°C, and in ordinary cases, a combination of synthetic resins having melting points differing from 20°C to 50°C between each other is employed for forming the non-oriented sheet. Furthermore, for the purpose of obtaining the reticulated structure consisting of minute fibrillated fibers uniformly distributed in the first synthetic resin, the first and the second synthetic resins must be admixed homogeneously before the resins thus mixed are formed into the non-oriented sheet and then drawn. This means that two kinds of resins which are of compatible nature (mutually soluble) or are capable of forming a fine, non-uniform dispersion are employed, and for the synthetic resin having a higher melting points, any of those which are crystalline or are easily crystallized are preferred.

It has been found that highly crystalline polyolefins (such as polyethylene, polypropylene, and the like), polyamides, polyesters (particularly polyethyrene-terephthalate), are suitable for use as the synthetic resin of higher melting point, and that low or non-crystalline polyolefins (such as olefin-copolymers, polybutene-1, and the like), vinyl resins (polyvinylchloride, polyvinylidene chloride, and the like), styrene resin (polystyrene or styrene-polymer with its ring or side chain substituted), or copolymers of monomers constituting the abovementioned high-melting-point of low-melting-point polymers are suitable.

Since the difference of the melting points is a relative quantity, any combination of resins can be selected from the abovementioned groups having high melting points and low melting points as long as the desired difference can be obtained. The mixing ratio of the two component resins is preferably determined so that the content of the lower melting point resin is from 15 to 95 percent by weight of the resultant mixture. If the content of the lower melting point resin is less than the stated described range, the drawing of the mixed sheet becomes impossible in many cases.

The inorganic powder employed in the synthetic paper according to the present invention is required for the formation of voids in the matrix phase and the reticulation of the synthetic resins and is also effective in promoting the fibrillation of the high melting point synthetic resin included in the synthetic paper. This inorganic powder may be any of the kinds used in the field of resin production as an inorganic filler, but it is preferable that the powder have a heat stability sufficient to withstand the temperature at which the mixed sheet is extruded and drawn or stretched. Furthermore, this inorganic powder is preferably of sufficiently minute size, that is, of a grain size in a range of from 0.1 to 5 microns, and the mixing proportion of the powder is preferably less than 60 percent by weight. When the mixing ratio of the inorganic powder is more than the abovementioned amount, the drawing, or stretchig of the mixed sheet is also made difficult. More practically, the inorganic powder may consist of calcium carbonate (of heavy and precipitated type), aluminum silicate compound (such as clay of agalmotolite or kaoline), silica compound (such as diatom), barium sulfate compound, titanium oxide compound, talc, or the like.

A mixture of the above described synthetic resins and inorganic powder is thereafter formed into a film-like structure drawn in its two orthogonal axes. While the biaxially drawn or stretched film may be produced from the above described mixture directly in one step, it is more ordinarily produced by once forming the mixture into a sheet of substantially nonoriented nature which is thereafter biaxially drawn or stretched. The formation of the nonoriented sheet may be carried out by any arbitrary or conventional procedure such as an extrusion method, inflation method, and so forth. It is permissible that a certain extent of drawing or stretching be done in this step of forming the nonoriented sheet. The thickness of the sheet at this stage is ordinarily in a range of from 0.1 to 3 mm.

The non-oriented sheet is then drawn or stretched along two orthogonal axes. Although it is preferable that the sheet be first drawn or stretched along its longitudinal axis and then drawn or stretched along a lateral axis, it may also be drawn or stretched in the reversed sequence or in a simultaneous step along the longitudinal and lateral axes. A drawing or stretching factor in either of the directions of more than twice the length is desirable. More precisely, when the drawing or stretching factor is expressed in terms of the area-multiplication factor, a value falling within a range of from 9 to 50 times is preferable. Thus, with a suitable value selected for the drawing or stretching factor depending on the thickness of the non-oriented sheet, the thickness of the resultant product can be adjusted in a desired range.

As is well known, all of the drawable or stretchable synthetic resisns have respective optimum drawing or stretching temperatures. The optimum drawing or stretching temperature is herein defined as the temperature at which the synthetic resin is drawn at maximum speed with minimum tensile strength, and yet the molecular orientation in the sheet is nevertheless maintained. For a resin of crystalline nature, the optimum drawing temperature is high when the melting point of the resin is high and is low when the melting point of the resin is low. Furthermore, it is found that a resin of non-crystalline nature has an optimum drawing or stretching temperature above the glass-transition temperature of the resin.

It should be noted that the optimum drawing or stretching temperature of a synthetic resin is variable depending on the conditions under which the synthetic resin is drawn. Accordingly, the optimum drawing or stretching temperature of the first synthetic resin is also varied in cases where only the first synthetic resin exists without being mixed with others and where the second synthetic resin is mixed with the first synthetic resin even if other conditions remain the same. Generally, when the coexisting other synthetic resin is of a higher melting point than the synthetic resin in question, the optimum drawing or stretching temperature of the synthetic resin will be shifted or extended to the higher temperature side, and extent of the shifting or extension depends on the mixed amount of the coexisting synthetic resin.

When the non-oriented sheet is drawn or stretched at the optimum drawing or stretching temperature of a component synthetic resin having a lower melting point or a lower glass transition temperature with the above described drawing factor, the resultant film-like structure contains dispersed reticulated fibers consisting of the synthetic resin of higher melting point and also with minute voids founded by the inorganic powder contained in the non-oriented sheet and is reduced in thickness to a value falling within the range of from 20 to 300 microns.

Figure 2:
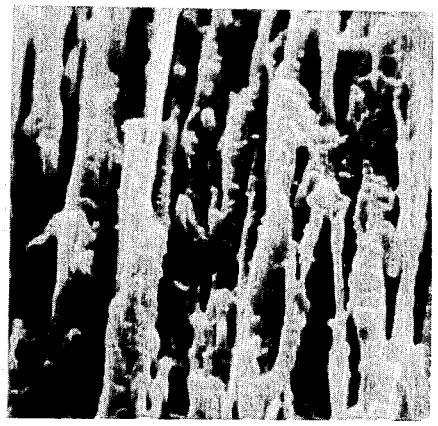
FIGS. 2 and 4 are microscopic photographs of sectional surfaces of the same paper-like films.
Figure 3:
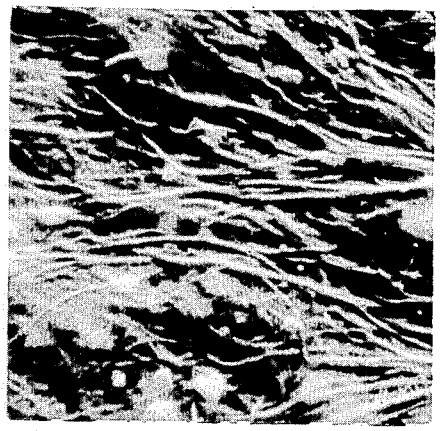
Figure 4:

The accompanying FIGS. 1 and 3 are microscopic photographs of the outer surface of a paper-like film thus obtained, and FIGS. 2 and 4 are microscopic photographs of a cross-sectional area of the same film. All of these photographs clearly show the reticulated structure of the paper-like film.

Although a synthetic paper consisting of a single sheet of the paper-like film of the above described structure is the most typical of the synthetic papers according to the present invention, it will be also apparent that various modifications as described hereinbelow can be carried out within the scope of the present invention.

1. Multiplication of the component synthetic resins:

Both of the matrix phase and the reticulated structural phase may be made of several kinds of synthetic resins. The nature of the additionally employed synthetic resins should be substantially the same as that of the basically employed synthetic resins. However, when both of the phases employ additional synthetic resins other than the basic synthetic resins, the difference between the melting points of the additional resins included respectively in the two phases is not necessarily more than 15°C.

2. Modification on the filler:

For the purpose of creating the minute voids, rendering or improving the reticulated and fibrillated structure, or improving the writability or printability of the resultant synthetic paper, the addition of a minute inorganic powder as a filter is desirable. The above described purposes can be fulfilled to the maximum extent by selecting the kind, grain size, and the mixed quantity of the inorganic powder or by additionally using one or more kinds of inorganic powder. In same specific cases, however, the mixed quantity of the inorganic powder may be reduced to a far smaller value than that above stated (for instance to 1 percent by weight).

On the other hand, in accordance with necessity, the mixed sheet to be drawn or stretched into the film-like structure may also contain other fillers of the kinds ordinarily used in this kind of synthetic resin compounds such as a stabilizer, plasticizer, coloring material, organic filler (in powder form or in fibrous form), foaming agent, and the like. These fillers may be added at the stage of mixing of the component materials into the mixture to be formed into the non-oriented sheet, or these may be mixed beforehand into the component synthetic resins which are thereafter mixed to form the above described mixture.

3. Surface treatment:

Although the paper-like film having the above described structure already possesses sufficient characteristics to be employed as the previously described paper-like layer, the film may be further subjected to a surface treatment if necessary. Typical examples of the surface treatment are a corona discharge treatment, oxidizing flame treatment, and sandblast treatment. A further example of the surface treatment comprises treating the surface of the paper-like film with a synthetic resin solution. More specifically, the surface of the film may be treated with a solution which consists of an acrylate-ester polymer (of a lower alkylester) dissolved in a positive solvent with respect to preferable the synthetic resins forming the paper-like layer (for forming the matrix and/or reticulated structure). The positive solvent is herein defined as a solvent having an action at least to swell the synthetic resins forming the paper-like layer at a treating temperature (of at least 50°C) (Reference: Japanese Patent Application No. 89932/68.

4. Lamination:

Although the above described paper-like film in itself can be employed as the paper-like layer, in other words, as a single layer synthetic paper, it is also possible to laminate a plurality of the paper-like film into a multilayer synthetic paper. One example of this, lamination is in the provision of a synthetic paper wherein the above described paper-like film or films are bonded on one or two surfaces of a lining film. A wide variety of modifications can be considered for this kind of structure depending on the existence or nonexistence of drawing or stretching of the lined film, existence or non-existence of fillers, and on the bonding methods of the paper-like film or films. For instance, the synthetic resin structure forming the paper-like layer and another synthetic resin structure forming the lining film may be extruded simultaneously, or one of the synthetic resin structure may be laminated by being extruded on the other synthetic resin structure already formed into a film, so that the non-oriented sheet is thereby formed, and the non-oriented sheet may be thereafter drawn or stretched into a laminated synthetic paper.

The abovementioned lining film may be either one of the ordinary synthetic film and the paper-like film in the scope of the present invention, or if it is required, the film may be a non-synthetic resin film such as a cellulose paper or even a metal. The lamination may also be carried out without employing any bonding agent as in the case of the extrusion lamination, or when it is required, it may carried out by employing a bonding layer or through the interposition of an anchor layer.

Another kind of example of the laminated synthetic paper can be obtained by providing a low melting point synthetic resin layer on the surface of a paper-like layer for rendering a better heat-sealing nature. For the low melting point synthetic resin layer, the same material as those employed for the aforementioned low melting point synthetic resin or other material having a still lower melting point can be employed. Although various kinds and compositions inclusive of the existence or nonextistence of fillers and with or without the drawing may be considered for the low-melting point synthetic resin, it is preferable to provide the low-melting point synthetic resin layer on the substrate paper-like layer before the layer is drawn or stretched, as in the case of the above described lining film, and then the entire combination of the overlaid low-melting point synthetic resin and the substrate can be subjected to a drawing or stretching process.

Figure 5:
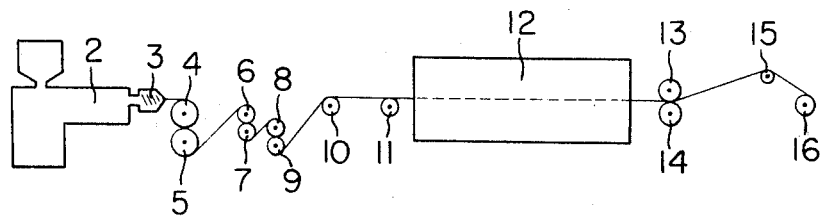
FIG. 5 is a schematic view indicating a typical example of process for producing the synthetic paper according to the present invention.

A typical process for producing the above described synthetic paper is illustrated in FIG. 5. In this production process, a mixture consisting of a high-melting point synthetic resin and a low-melting point synthetic resin inclusive of the minute inorganic powder is heated in an extrudable temperature and kneaded therein and is then extruded through the slit of a die 3 of the extruder 2. The extruded mixture is then cooled to a required temperature by means of a cooling device 4 and 5 so that a non-oriented sheet 1 is thereby obtained. In this case, the cooling device may be of any type for roll cooling or water-bath cooling or a combination thereof.

The non-oriented sheet 1 is thereafter heated by means of metal rolls 6 and 7 to a temperature required for the drawing or stretching (employment of an infrared ray heating apparatus instead of or in cooperation with the above described metal rolls 6 and 7 is also possible) and then drawn or stretched in its longitudinal direction to twice its original length by means of two rolls 7 and 8 rotated at different speeds. The sheet thus drawn or stretched in one direction is thereafter fed through rolls 9, 10, and 11 to a tentering machine 12 set to a required temperature, and the width of the sheet is drawn or stretched laterally to more than twice the original width. The laterally drawn or stretched sheet is then cooled while being held in its drawn or stretched state. The side and longitudinal edges of the sheet are trimmed, after which the sheet is fed through rolls 13, 14, and 15 and taken up on a winding roll 16.

The synthetic paper in accordance with the present invention can be used in substantially all fields of paper appliances except those utilizing the effect caused by entangled cellulose fibers. For instance, the paper can be used in the fields of wrapping, writing, printing, covering, and tableting, for exhibition purposes such as posters, and for wiping as in the case of the tissue paper. Furthermore, the paper can be further processed into a tracing paper, chits, map paper, labels, art coat paper, photograph printing paper, and other special papers.

EXAMPLE 1

1. Resin mixture:
Polyethylene (MI = 0.95, SG = 0.96) – 60 parts
Isotactic polypropylene (MI = 1.0) – 18 parts
Polystyrene [$\eta$] (toluene 25°C) = 1.3) – 8 parts
Diatom earth (average grain diameter 4 $\mu$) – 6 parts
Clay (average grain diameter 1 $\mu$) – 6 parts Titanium oxide (average grain diameter 0.3 μ) – 2 parts Melting point of the above described polyethylene is 138°C, the melgint point of the isotactic polypropylens is 165°C, and the glass transition point of the polystyrene is 98°C. The optimum temperature ranges for drawing or stretching these materials at the drawing or stretching speed of 180 cm/min. are from 133° to 137°C, from 150° to 160°C, and 120° to 135°C, respectively.

2. Treatment

The above described mixture was heated, kneaded, and extruded through the die of an extruder at 230°C; cooled to a temperature lower than 40°C, and formed into a non-oriented sheet of 0.9-mm thickness.

This sheet was drawn or stretched at 135°C in its longitudinal direction so that 4 times the length was obtained and then drawn or stretched laterally so that 6 times the width was obtained. The drawing or stretching speed was considerably faster than 180 cm/min. The film thus obtained was cooled in the drawn or stretched condition, and after its lateral edges were trimmed, was wound on a roll.

The film thus produced was found to have following properties in addition to a high void factor, excellent opacity, whiteness, and smoothness of the surfaces, and excellent adaptability for writing and printing. The film had an excellent papery feel and stiffness and could be employed in substantially all fields of appliance of conventional papers.

Thickness (microns) – 38
Apparent density (g/cm$^3$)*$^1$ – 0.57
Voids – 46.3
Tensile strength (kg/cm$^2$) – longitudinally 514 laterally 799
Clarke stiffness – 4.2
Whiteness – 89.9
Opacity – 93.3
Surface smoothness (sec.)*$^2$ – 10,000 or more

*1 Since the value obtained from calculation is 1.05, considerable lowering of the density was caused by the existence of the voids.
2 Measured by an Oken-type smoothness tester.

EXAMPLE

1. Resin mixture:
Polyethylene (MI = 0.95, SG = 0.96) – 65 parts
Isotactic polypropylene (MI = 1.0) – 15 parts
Diatom earth (average grain diameter 4μ) – 20 parts
(The resins themselves are similar to those employed in Example 1)

2. Treatment

The above described mixture was heated, kneaded, and extruded through the die of an extruder of 230°C, cooled to a temperature lower than 40°C, and formed into a non-oriented sheet of 0.7-mm thickness.

This sheet was drawn or stretched at 135°C and a drawing or stretching speed of 180 cm/min in its longitudinal and lateral directions simultaneously so that it is extended to 4 × 4 times. The thus obtained film was cooled at the extended condition and the side edge portions were cut.

Thus produced film was found to have following natures beside of a high void factor, excellent opaqueness, whiteness, and smoothness of the surfaces, and found to be adapted for writing and printing. The film had also an excellent papery feeling and a stiffness and could be employed in substantially all kinds of applications adapted for the conventional papers.

Thickness (microns) – 105
Apparent desnity (g/cm$^3$) – 0.67
Voids – 38.0
Tensile strength (kg/cm$^2$) – longitudinally 725 laterally 471
Whiteness – 89
Opacity – 97
Surface smoothness (sec.) – 570

EXAMPLE 3

1. Resin mixture
Polyethylene (MI = 0.95, SG = 0.96) – 56 parts
Polystyrene ([η] (toluene 25°C) = 1.3) – 16 parts
Ethylene/vinyl acetate copolymer (content of vinyl acetate = 10%, MI = 4) – 8 parts
Diatom earth (average grain diameter 4μ) – 20 parts The above described polyethylene and polystyrene are the same as those employed in Example 1, and the ethylene/vinyl acetate copolymer has a melting point of 99°C and an optimum drawing temperature ranging from 80°to 90°C.

2. Treatment

The above described mixture was heated, kneaded, and extruded through the die of an extruder at 230°C, cooled to a temperature lower than 40°C, and formed into a non-oriented sheet of 0.9-mm thickness.

This sheet was drawn or stretched at 135°C and a drawing or stretching speed of 180 cm/min first in its longitudinal direction to 4 times its original length and then in its lateral direction to 7.5 times, and the film thus drawn was cooled in the drawn or stretched condition, the side edges thereafter being trimmed.

The resulting film had the following properties in addition to a high void factor, excellent opacity and whiteness, good writability, good papery feel, considerable stiffness, and excellent printability and was found to be effectively usable in substantially all fields of applications of conventional papers.

Thickness (microns) – 90
Apparent density (g/cm$^3$) – 0.64
Voids – 41.9
Tensile strength (kg/cm$^2$) – longitudinally 580 laterally 613
Whiteness – 87
Surface smoothness – 120

EXAMPLE 4

1. Resin mixture

| Parts | first sample | second sample | third sample |
|---|---|---|---|
| Polyethylene (MI=0.95, SG=0.96) | 68 | 63 | 56 |
| Polystyrene ([η]= 1.3) | 29 | 27 | 24 |
| Diatom earth (average g.d.=4μ) | 3 | 10 | 20 |

The kinds of the resins are the same as those employed in Example 1.

2. Treatment

Films obtained after the treatment set forth in Example 3 (except for drawing rations of 4.4) had the following excellent properties.

| Parts: | first sample | second sample | third sample |
|---|---|---|---|
| Thickness (microns) | 56 | 58 | 61 |
| Apparent density (g/cm$^3$) | 0.89 | 0.87 | 0.80 |
| Voids | 11.8 | 17.1 | 27.9 |
| Opacity | 35 | 58 | 86 |
| Surface smoothness | 1050 | 102 | 98 |

EXAMPLE 5

1. Resin mixture
   Polyethylene (MI = 0.95, SG = 0.96) – 57 parts
   Isotactic polypropylene (MI = 1.0) – 20 parts
   Polystyrene ([$\eta$] = 1.3) – 8 parts
   Clay (average grain diameter 1$\mu$) – 15 parts
   The kinds of resins employed herein are the same as those employed in Example 1.

2. Treatment

A non-oriented sheet was produced through the same procedure as described in Example 1 and was drawn through an extruder at the following drawing temperatures to 5 times in its longitudinal direction and 7 times in its lateral direction. The sheet thus drawn into a film-like configuration was then cooled in the drawn condition, and the side edges thereof were trimmed. As a result, it was found that the films except that drawn at a temperature higher than 165°C had excellent properties as follows.

| Drawing temp. | Apparent density | Void factor | Opacity |
|---|---|---|---|
| 140 | 0.445 | 59.5 | 99.0 |
| 145 | 0.494 | 55.0 | 98.2 |
| 150 | 0.655 | 40.5 | 93.2 |
| 155 | 0.740 | 32.7 | 88.0 |
| 160 | 0.895 | 18.6 | 76.5 |
| 165 | 1.03 | 6.4 | 58.3 |
| 170 | (Could not be drawn because the sample melted) | | |

A microscopic photograph of a surface of a synthetic paper drawn at 145°C is shown in FIG. 1, and a similar photograph of a cross-sectional surface of the same synthetic paper is shown in FIG. 2. Furthermore, another microscopic photograph of a surface of a synthetic paper drawn or stretched at 160°C is shown in FIG. 3 and the cross-sectional view is shown in FIG. 4. These photographs were taken by means of a scanning-type electron microscope manufactured by NIPPON DENSHI CO. (JSM – 2), with a magnification of 2,400 in all cases.

As is apparent from these photographs, fibrillated fibers are running through the matrix of a film having voids, and inorganic fillers are dispersed within the same matrix.

EXAMPLE 6

1. Resin mixture
   Polyethylene (MI = 0.95, SG = 0.96) – 70 parts
   Polybutene-1 (MI = 1.0, SG = 0.92) – 20 parts
   Diatom earth (average grain diameter 4) – 10 parts
   The polyethylene is the same as that employed in Example 1, and polybutene-1 has a melting point of 111°C and an optimum drawing temperature ranging from 85° to 100°C.

2. Treatment

The above described mixture was heated, kneaded, and extruded through the die of an extruder so that a non-oriented sheet of 0.8-mm thickness was obtained. This sheet was thereafter drawn or stretched at 130°C to 4 times the original length in the longitudinal direction and then to 4 times the original width in the lateral direction and was cooled in the drawn or stretched condition, the side edges thereof being thereafter trimmed. The film thus obtained had the following properties and was found to be usable in the application field of conventional paper.

Thickness (microns) – 45
Apparent density (g/cm$^3$) – 0.89
Voids – 12%
Opacity – 65%

EXAMPLE 7

1. Resin mixture
   Polyethylene (MI = 0.95, SG = 0.96) – 70 parts
   Ethylene/vinly acetate copolymer (SG = 0.93) content of vinyl acetate is 10 wt. %) – 20 parts
   Diatom earth (average grain diameter of 4$\mu$) – 10 parts
   The above resins are the same as those employed in Example 3.

2. Treatment

An opaque film was produced with the above materials in accordance with Example 6 and was found to be suitable for the same purposes and applications as those for conventional papers.

Thickness (microns) – 49
Apparent density (g/cm$^3$) – 0.82
Voids – 18.8%
Opacity – 67%

I claim:

1. A synthetic paper comprising a layer in the form of a substantially opaque film, said layer comprising a film matrix of a first synthetic resin stretched along at least one axis thereof, a second synthetic resin split into fibrillated fibers of reticulated structure dispersed in said film matrix of said first synthetic resin, and said layer having a fine inorganic filler in an amount less than 60 wt. % of said first and second synthetic resins, whereby a void percentage of more than 10 percent is attained in said layer.

2. A synthetic paper as defined in claim 1 wherein only said layer is employed for obtaining said synthetic paper.

3. A synthetic paper as defined in claim 1 wherein a plurality of layers, at least one of which is the first-mentioned layer, are employed for obtaining said synthetic paper.

4. A synthetic paper as defined in claim 1 wherein said first and second synthetic resins are polyethylene and isotatic polypropylene, respectively.

5. A synthetic paper as defined in claim 1 wherein said first and second synthetic resins are polyethylene + polystyrene and isotactic polypropylene, respectively.

6. A synthetic paper as defined in claim 1 wherein said first and second synthetic resins are polystyrene + ethylene/vinyl acetate copolymer and polyethylene, respectively.

7. A synthetic paper as defined in claim 1 wherein said first and second synthetic resins are polystyrene and polythylene, respectively.

8. A synthetic paper as defined in claim 1 wherein said first and second synthetic resins are polybutene-1 and polyethylene, respectively.

9. A synthetic paper as defined in claim 1 wherein said first and second synthetic resins are ethylene/vinyl acetate copolymer and polyethylene, respectively.

* * * * *